(12) United States Patent
Jeffcoat et al.

(10) Patent No.: US 6,541,060 B2
(45) Date of Patent: Apr. 1, 2003

(54) STABILIZED OR STABILIZED, CROSSLINKED WAXY POTATO STARCH

(75) Inventors: Roger Jeffcoat, Bridgewater, NJ (US); William R. Mason, Somerville, NJ (US); Joseph L. Emling, Decatur, IL (US); Chung-Wai Chiu, Westfield, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 17 days.

(21) Appl. No.: 10/041,149

(22) Filed: Jan. 7, 2002

(65) Prior Publication Data

US 2002/0090446 A1 Jul. 11, 2002

Related U.S. Application Data

(60) Division of application No. 08/936,093, filed on Sep. 23, 1997, now Pat. No. 6,488,980, which is a continuation-in-part of application No. 08/820,199, filed on Mar. 19, 1997, now abandoned
(60) Provisional application No. 60/013,937, filed on Mar. 22, 1996.

(51) Int. Cl.⁷ .................................................. A23L 1/05
(52) U.S. Cl. ...................... 426/578; 426/579; 426/589; 426/661; 536/106
(58) Field of Search .......................... 536/106; 426/661, 426/578, 579, 589

(56) References Cited

U.S. PATENT DOCUMENTS

| | | |
|---|---|---|
| 2,328,537 A | 9/1943 | Felton et al. ................. 127/33 |
| 2,801,242 A | 7/1957 | Kerr et al. ................. 260/233.5 |
| 3,278,522 A | 10/1966 | Goldstein et al. ......... 260/233.3 |
| 3,443,964 A | 5/1969 | Marotta et al. .................. 99/83 |
| 3,577,407 A * | 5/1971 | Hjermstad .................... 536/106 |
| 3,579,341 A | 5/1971 | Trubiano et al. ................ 99/83 |
| 3,751,410 A | 8/1973 | Caracci et al. ............ 260/233.5 |
| 3,832,342 A * | 8/1974 | Rutenberg et al. ........... 536/106 |
| 3,951,947 A | 4/1976 | Schoenefelt et al. .. 260/233.3 R |
| 4,452,978 A | 6/1984 | Eastman ...................... 536/111 |
| 4,973,447 A | 11/1990 | Seib et al. ................... 426/549 |
| 4,981,710 A | 1/1991 | McComber et al. ......... 426/578 |
| 5,562,937 A | 10/1996 | Senkeleski et al. ........... 426/48 |
| 5,641,349 A | 6/1997 | Koubek et al. .......... 106/706.1 |
| 5,647,898 A | 7/1997 | Fuertes et al. ........... 106/162.1 |
| 5,688,845 A | 11/1997 | Eden et al. .................... 524/48 |
| 5,720,822 A | 2/1998 | Jeffcoat et al. ................ 524/48 |
| 5,725,676 A | 3/1998 | Chiu et al. ..................... 127/34 |
| 6,187,366 B1 * | 2/2001 | Ensor et al ................. 426/641 |

FOREIGN PATENT DOCUMENTS

| | | |
|---|---|---|
| CA | 2061443 | 3/1919 |
| FR | 2240235 | 3/1975 |
| SE | 9502629 | 7/1995 |
| WO | WO 92/11376 | 9/1992 |
| WO | WO 97/03573 | 6/1997 |

* cited by examiner

Primary Examiner—Nina Bhat
(74) Attorney, Agent, or Firm—Karen G. Kaiser, Esq.

(57) ABSTRACT

Compositions, particularly foodstuffs, were thickened by the inclusion of an effective amount of a stabilized waxy potato starch, particularly a stabilized, crosslinked waxy potato starch, more particularly a hydroxypropylated waxy potato distarch phosphate. Compositions which include the starch may be thickened using less starch than if other starches were used. Foodstuffs prepared using the starch were improved in that they have better flavor, texture, and appearance.

14 Claims, 2 Drawing Sheets

STABILIZED OR STABILIZED, CROSSLINKED WAXY POTATO STARCH

This application is a Divisional of 08/936,093 filed Sep. 23, 1997, which is a Continuation-in Part of 08/820,199 filed Mar. 19, 1997, which claims benefit of 60/013,937 filed Mar. 22, 1996.

BACKGROUND OF THE INVENTION

The present invention relates to the use of a stabilized, particularly a stabilized, crosslinked waxy potato starch to increase the viscosity of a composition, particularly a food product. Starch is the primary form of carbon reserve in plants, constituting 50% or more of the dry weight in many storage organs, i.e., tubers, seeds of cereals. It consists of two major components: amylose, an essentially linear polymer of (1→4) -D-glucopyranose units: and amylopectin, a branched polymer of shorter chains of (1→4) -D-glucopyranose units with (1→6) branches.

Starch in various forms is of great importance in the food and paper industry. Many different starch products are known which originate from, inter alia, maize, tapioca, rice, and potato. In many cases, however, it is necessary to modify the native starches, via chemical, biochemical, and/or physical means, in order to produce the distinct properties necessary to suit particular applications.

Maize starch which is substantially pure amylopectin is also known as waxy maize starch. As used herein, waxy potato starch refers to a potato starch which is high in amylopectin. Waxy-type starches are useful for food applications in that their functionality differs from starches higher in amylose. When starch is heated in an aqueous medium, the granule swells. During this swelling, amylose tends to solubilize and leach out into the surrounding water where it reassociates through hydrogen bonding to initiate gelation, forming a paste that becomes cloudy and opaque as it cools. Over a period of time, the starch network continues to shrink, resulting in a stronger gel which can also result in the release of water. The configuration of amylopectin discourages reassociation so that gelling does not readily occur and the resulting pastes are more flowable and clear.

Several processes have been developed to produce a starch high in either amylose or amylopectin, including physical means of separation, classical plant breeding, and genetically engineered modification of the plants such that primarily one type of starch is produced. For example, WO 92/11376 and CA 2,061,443 disclose genetically engineered modification of potato starch to suppress the formation of amylose, producing a potato with a starch content containing essentially pure amylopectin.

Starch functionality can be chemically modified as well. For example, the swelling and subsequent rupture of starch granules during cooking can be controlled by introduction of difunctional agents capable of reacting with the hydroxyl groups of two different molecules within the granule. This is called cross-linking or inhibition. The synthetic bonds reinforce the natural hydrogen bonding, retarding the rate of granule swell and reducing the sensitivity of the swollen granule to rupture. This results in cocked pastes which are more viscous and heavy bodied and are less likely to breakdown with extended cooking times, increased acid or severe agitation.

Waxy starch pastes show little tendency to gel or retrograde when stored under normal conditions at ambient temperatures. However, when stored under refrigerated or freezing conditions, a waxy paste tends to become cloudy and chunky and will release water similar to pastes made with amylose-containing starches. Stabilization reduces the tendency of waxy starches to lose their hydrating ability and clarity upon storage at low temperatures.

Various starches are known to be useful as thickeners in the food industry. However, it is generally preferable to limit the use of starch for several reasons. Firstly, starch adds flavor to foodstuffs. In many foodstuffs, this starchy or cereal flavor is undesirable and difficult to mask.

Secondly, high levels of starch add cohesiveness to foodstuffs. Such texture is undesirable in many foodstuffs where the consumer prefers a shorter texture, such as one that is creamy and/or smooth.

Thirdly, starch adds opacity to foodstuffs. In many foodstuffs, it is desirable to have more clarity; not only to produce clearer foodstuffs, but also to provide truer colors.

Fourthly, starch adds calories to foodstuffs. Currently, a significant segment of the consumer market is watching their weight. Therefore, lower calorie foodstuffs are often desirable. By adding less starch, which contributes approximately 4 Kcal/g. and replacing the unnecessary starch with lower or no calorie bulking materials, the calorie content of a foodstuff can be decreased.

Fifthly, functional starch may be costly. Many starches which add specific functionality to foodstuffs are expensive due to the modifications which provide the functionality. Using less starch could therefore reduce the cost of producing the foodstuff.

Surprisingly, it has now been discovered that certain stabilized, particularly stabilized and crosslinked, waxy potato starches, have unexpectedly high viscosities such that they can provide the desired viscosity to a composition while using substantially less than would be need if using a conventional starch thickener or viscosifier.

SUMMARY OF THE INVENTION

The present invention is directed to an unexpectedly high viscosity modified waxy potato starch obtained by controlling the type and degree of stabilization, particularly the type and degree of stabilization and the level of crosslinking. Such starch is useful as a thickener or viscosifier. By using such starches, the same magnitude of viscosity may be obtained using less starch than if other starches were used, including stabilized or stabilized and crosslinked starches originating from other grains including potato, corn, waxy corn, rice and waxy rice. These starches have the added benefits of good clarity and short, smooth texture.

An object of the present invention is to provide a stabilized, particularly a stabilized, crosslinked waxy potato starch.

Another object of the present invention is to provide such a starch with a high viscosity, good clarity, and a short, smooth texture.

A further object of the present invention is to provide a composition, particularly a foodstuff, which uses less starch to obtain its desired viscosity.

These and other objects of the present invention will become apparent to one skilled in the art from the following detailed description and examples below.

DETAILED DESCRIPTION OF THE INVENTION

The present invention is directed to an unexpectedly high viscosity waxy potato starch obtained by controlling the type and degree of stabilization, particularly the type and degree of stabilization and the level of crosslinking. Such starch, particularly a hydroxypropylated, waxy potato distarch phosphate, is useful as a thickener or viscosifier. By using such starch, the same magnitude of viscosity may be obtained using less starch than if other starches were used as the base material, including potato, corn, waxy corn, rice or waxy rice. The stabilized and stabilized, crosslinked waxy potato starches have the added benefits of good clarity and short, smooth texture.

The present starches are prepared by stabilizing or stabilizing and crosslinking a waxy potato starch. To stabilize the waxy potato starch, an aqueous starch slurry containing from about 10 to about 40% solids is prepared. From about 20 to about 30% percent sodium sulfate based on the weight of the starch is added. The pH is then adjusted to about 11 to about 13 by addition of a 3% sodium hydroxide solution in an amount of from about 40 to about 60% based upon the weight of the starch. A stabilizing agent is added in an amount of about 1% to about 25%, particularly from about 3 to about 20%, most particularly from about 5 to about 15%, by weight of the starch. Stabilizing agents suitable for the present invention include, but are not limited to alkylene oxides, such as ethylene and propylene oxide, particularly propylene oxide. The temperature is brought to below about 50° C. and the process is allowed to continue for about 18 to about 24 hours.

If the starch is to be crosslinked as well as stabilized, a lower degree of stabilization is generally used. In such case, the stabilizing agent is added in an amount of from about 1% to about 25%, particularly from about 3 to about 10%, most particularly from about 5 to about 10%, by weight of the starch.

To crosslink the starch, the slurry is brought to a temperature of about 30° C. and crosslinked by addition of a crosslinking agent. The temperatures which may be used are known in the art and are dependent upon the crosslinking agent used, the time and pH of the reaction, and the degree of crosslinking desired. Crosslinking agents suitable for the present invention include, but are not limited to adipic/acetic mixed anhydride, epichlorohydrin, sodium trimetaphosphate, sodium trimetaphosphate/sodium tripolyphosphate, acrolein, and phosphorous oxychloride, particularly sodium trimetaphosphate and phosphorous oxychloride, more particularly phosphorous oxychloride. Epichlorohydrin or phosphorous oxychloride is added in an amount of from about 0.001 to about 1%, particularly from about 0.01 to about 0.15%, more particularly from about 0.01 to about 0.05% by weight of the starch. Adipic/acetic mixed anhydride, sodium trimetaphosphate, or sodium trimetaphosphate/sodium tripolyphosphate is added in an amount of from about 0.1 to about 10%, particularly from about 0.1 to about 1.5%, more particularly from about 0.1 to about 0.5% by weight of the starch. Acrolein is added in an amount of from about 0.001 to about 0.6%, paricularly from about 0.1 to about 0.4%, by weight of the starch. The reaction is allowed to continue for approximately 15 minutes to 24 hours depending upon the temperature, and pH of the reaction, the crosslinking agent, and the degree of crosslinking desired: the time of reaction is within the skill of one in the art.

Crosslinking may be conducted either before or after stabilization, but is conventionally conducted after stabilization. After modification, the pH is conventionally adjusted to approximately 3.0 with sulfuric acid and held for one hour to remove unreacted stabilizing agent. The modified starch slurry may also be neutralized, washed, and dried for use. In the alternative, the modified starch slurry may be incorporated directly into the composition to be thickened.

The above methods of stabilizing and crosslinking the waxy potato starch is meant to be exemplary. Other methods, known in the art, of stabilizing and/or cross-linking the starch may be used. For example, see Wurzburg, O. B., *Modified Starches: Properties and Uses*; CRC Press, Inc.: Fla. (1986).

The resultant modified waxy potato starch has an unexpectedly high viscosity, at least three times, particularly at least five times, more particularly at least ten times, even more particularly at least fifteen times, that of the modified starch prepared from common (non-waxy) potato starch.

The resultant modified waxy potato starch may be used as a thickener or viscosifier; that is to increase the viscosity of a fluid or semisolid composition. The composition may be a slurry or a solution and may be of any pH. In particular, foodstuffs may be thickened by the present starch. Foodstuffs is intended to include any edible product, including, but not limited to: dressings, including pourable dressings and spoonable dressings; pie fillings, including fruit and cream fillings; sauces, including white sauces and dairy-based sauces such as cheese sauces; gravies; lite syrups; puddings; custards; yogurts; sour creams; beverages, including dairy-based beverages; glazes; and soups. Further, foodstuffs is intended to include those which undergo various processing and storage conditions including, but not limited to, retorting, aseptically filled packaging, refrigeration, and freezing.

The present starch may be added in any amount necessary to obtain the desired viscosity of the composition. In general, the starch may be added in an amount of. from about 0.01% to about 50% of the composition by weight. For a foodstuff, the starch may be added in an amount of from about 0.01 to about 10%, particularly from about 0.1 to about 5% by weight of the foodstuff. In particular, when using a hydroxypropylated waxy potato distarch phosphate, use levels by weight of the foodstuff are: spoonable dressings (about 1.5 to 3.5% starch); pie fillings (about 1.5 to 5.0% starch); sauces (about 1.0 to 4.0% starch), including dairy-based sauces; lite syrups (about 0.5 to 1.5% starch); puddings (about 1.0 to 4.5% starch); yogurts (about 0.25 to 0.75% starch); beverages (about 0.25 to 0.75% starch); and soups (about 0.25 to 2.0% starch). The level of modified potato starch will depend upon the composition to which it is added and the desired end viscosity.

Due to the high viscosity of the present modified starch, it can be added in an amount equal to from about 0.05 to about 0.85 of a conventionally used starch to result in the same viscosity. When the composition is a foodstuff, the present starch may be added in an amount equal to from about 0.05 to about 0.90, particularly from about 0.20 to about 0.90, more particularly from about 0.50 to about 0.90, of a conventionally used starch to result in the same viscosity. Thus, less of the present starch can be used to obtain the desired viscosity of the composition.

The present starch also has the advantage of having good clarity and contributing a short, smooth texture and a heavy body to the composition. Such characteristics are important in many foodstuffs as they are central to consumer acceptance. Optical clarity is especially important in clear foodstuffs such as broths, syrups, and fruit fillings. It is further important in that opacity changes the color of foodstuffs, for example yielding pinkish tomato products instead of the desired red color. A short smooth texture is important in that consumers do not like certain foodstuffs to have a gelled or cohesive texture. This is especially important in creamy products such as dairy products and in liquid products such as broths, soups, and syrups.

Further, the present starch may exhibit excellent stability when subjected to various processing and storage conditions, including high temperature, low temperature, and high shear. Thus, the present starch may be particularly useful in foodstuffs which are retorted, aseptically filled, or frozen.

The present stabilized starch is especially useful in foodstuffs in which fill viscosity is needed for the retorting process; in low moisture foodstuffs such as processed meat products; and in foodstuffs receiving minimum heating or shear during processing such as instant soups and instant beverages.

The present stabilized, crosslinked starch is especially useful in foodstuffs in which freeze-thaw stability is important. Such starch is also especially useful in foodstuffs which are retorted.

EXAMPLES

Figure 1:
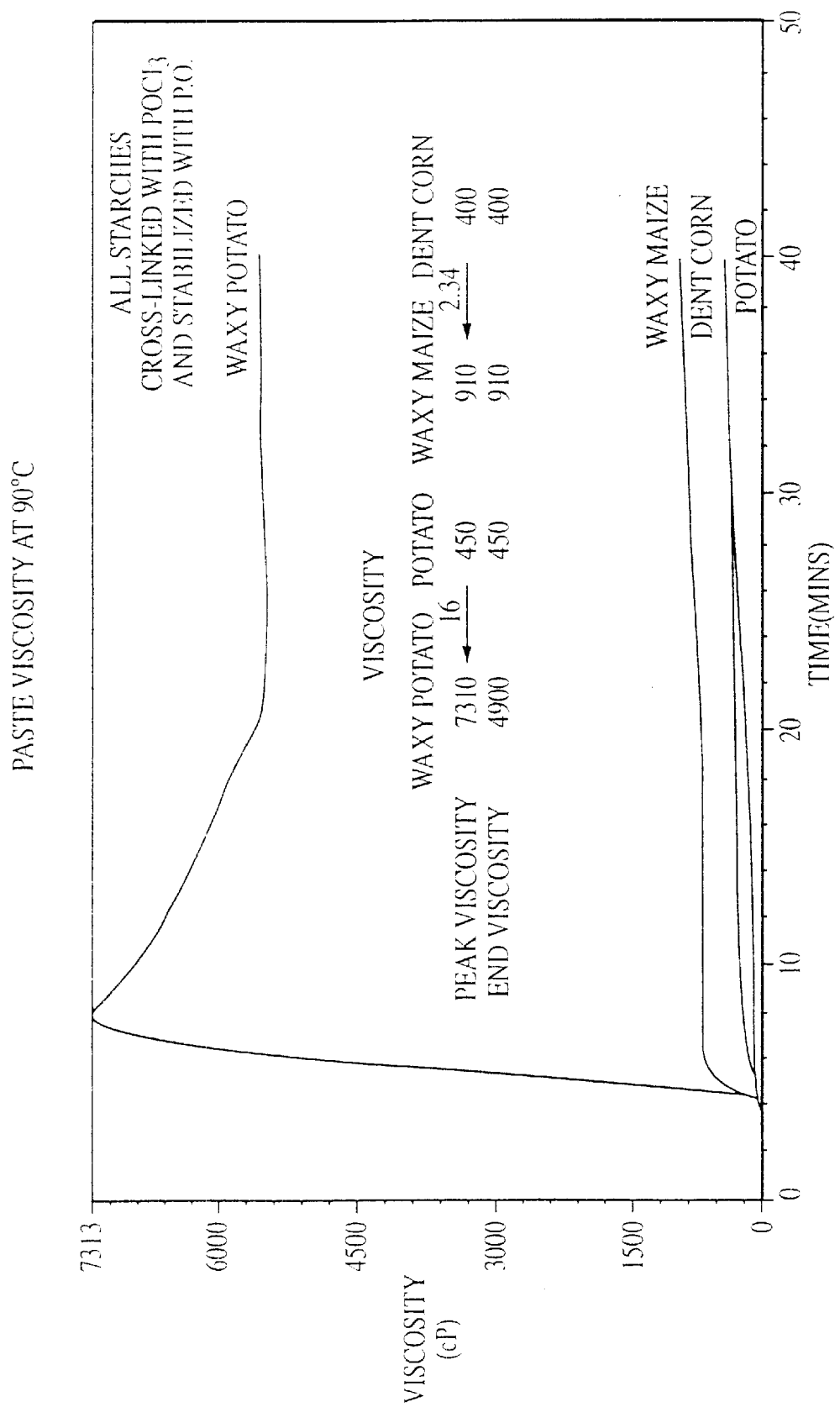
FIG. 1 is a graph of the paste viscosity at 90° C.
Figure 2:
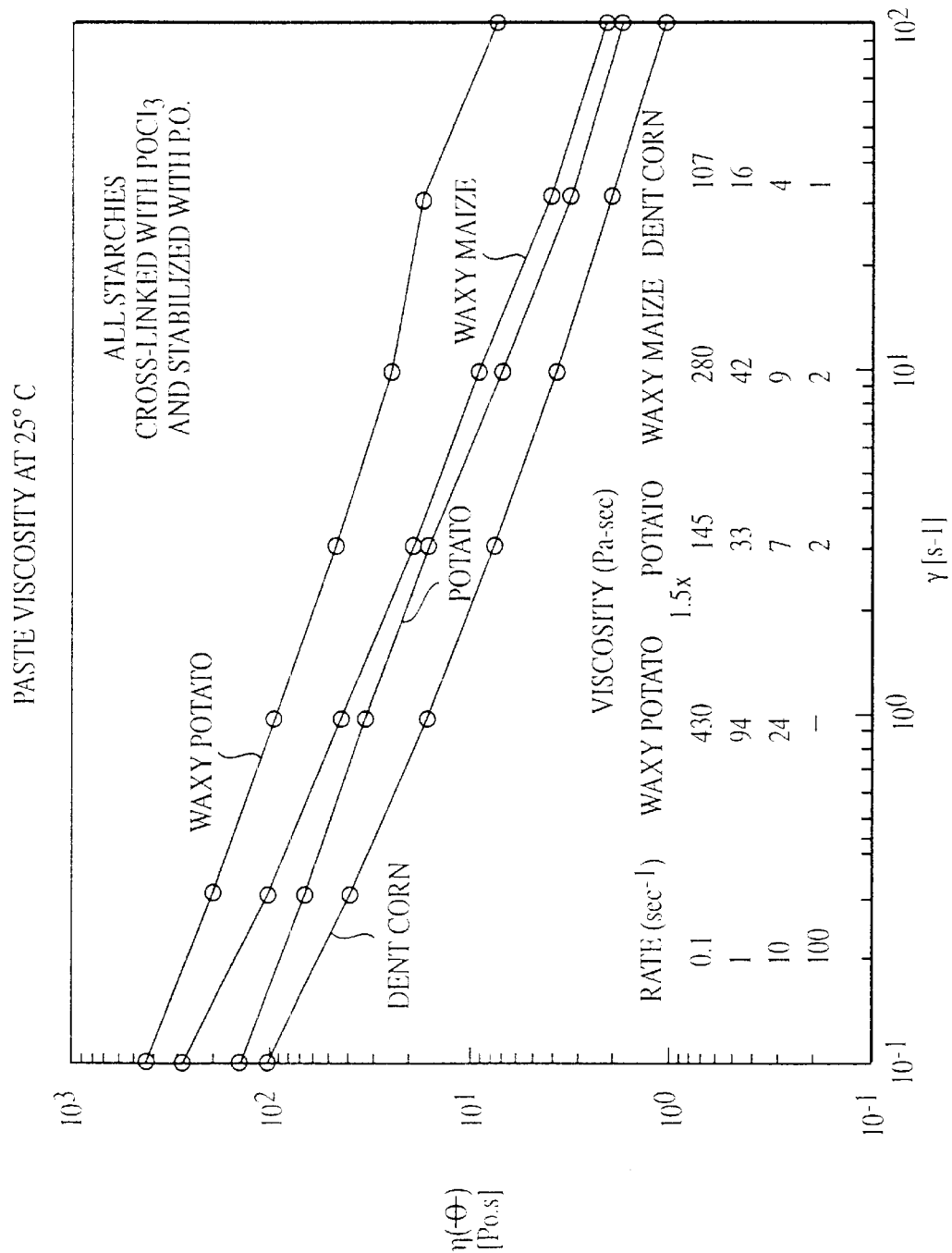
FIG. 2 is a graph of the paste viscosity at 25° C.

The following examples are presented to further illustrate and explain the present invention and should not be taken as limiting in any regard.

Example 1

Preparation of a Hydroxypropylated Waxy Potato Starch

A starch slurry was prepared which contained 1000 g waxy potato starch and 1500 g water. To this slurry was added 250 g sodium sulfate. The pH was then adjusted to 11–12 by addition of 500 g of a 3% sodium hydroxide solution.

Next, 85.2 g propylene oxide was added to stabilize the starch and the reaction was allowed to proceed for 18 hours at a temperature of 40 to 45° C. The slurry was then cooled to 30° C.

The slurry was then neutralized to a pH of 5–7 using a 3% solution of hydrochloric acid, washed with distilled water, and dried using conventional means known in the art. The resultant starch was a hydroxypropylated, waxy potato starch.

Example 2

Hot Paste Viscosity Measurement

A slurry containing 5.5% starch on a dry weightbasis was prepared and heated from 50° C. to 90° C. at a rate of 1.5° C. per minute. The slurry was then held at 90° C. for seventeen (17) minutes. Hot viscosity was measured while heating the paste in an RVA Series 4 Rapid Visco Analyzer (Newport Scientific, New South Wales, Australia).

Modified dent corn, waxy corn, and potato starches were prepared using the procedure of example 1 except the various base starches were substituted for the waxy potato starch. Further, example 1 was repeated using half the amount (4%) of propylene oxide to modify each of the four base starches (dent corn, waxy corn, potato, and waxy potato). The hot viscosity of the base starches and the hydroxypropylated starches were measured and the results are shown in Table I, below.

TABLE I

| Peak Hot Viscosity Measurements (cps) | | | |
|---|---|---|---|
| BASE STARCH ↓ | 0% PO | 4% PO | 8% PO |
| DENT CORN | 370 | 540 | 470 |
| WAXY CORN | 1350 | 1300 | 1450 |
| POTATO | 3700 | 3300 | 3500 |
| WAXY POTATO | 3500 | 4000 | 4600 |

As can be seen from the above Table I, above, controlling the degree of stabilization of waxy potato starch yields an unexpected increase in viscosity. Eight percent hydroxypropylation results in a viscosity increase of 1100 cps over non-hydroxypropylated waxy potato starch. In comparison, an eight percent hydroxypropylation of dent corn, waxy corn, and potato results in a viscosity increase of only 100, 100, and −200 cps, respectively, over the non-hydroxypropylated base starches.

Example 3

Preparation of a Hydroxypropylated Waxy Potato Distarch Phosphate

A starch slurry was prepared which contained 1000 g waxy potato starch and 1500 g water. To this slurry was added 250 g sodium sulfate. The pH was then adjusted to 11–12 by addition of 500 g of a 3% sodium hydroxide solution.

Next, 81 g propylene oxide was added to stabilize the starch and the reaction was allowed to proceed for 18 hours at a temperature of 40 to 45° C. The slurry was then cooled to 30° C.

Next, 0.17 g phosphorous oxychloridewas added to crosslink the starch. The reaction was allowed to proceed for 30 minutes. The pH was then adjusted to 3.0 with sulfuric acid and held for one hour.

The slurry was then neutralized to a pH of 5–7 using a 3% solution of sodium hydroxide, washed with distilled water, and dried using conventional means known in the art. The resultant starch was a hydroxypropylated, waxy potato distarch phosphate.

Example 4

Viscosity Measurements

A. Hot Paste Viscosity Measurement

A slurry containing 5.5% starch on a dry weight basis was prepared and heated from 50° C. to 90° C. at a rate of 1.5° C. per minute. The slurry was then held at 90° C. for seventeen (17) minutes. Hot viscosity was measured while heating the paste in an RVA Series 4 Rapid Visco Analyzer (Newport Scientific, New South Wales, Australia).

Modified dent corn, waxy corn, and potato starches were prepared using the procedure of example 3 except the various starches were substituted for the waxy potato starch. The hot viscosity of these hydroxypropylated distarch phosphates, as well as the hydroxypropylated waxy potato distarch phosphate prepared in example 3, were measured and the results are shown in Graph 1, below.

As can be seen from Graph 1, controlling the degree of stabilization and the level of crosslinking of waxy potato starch yields an unexpected increase in viscosity. The modified waxy potato starch has a peak viscosity approximately sixteen times that of modified potato starch. In contrast, the modified waxy corn starch has a peak viscosity-only twice that of modified dent corn starch.

B. Cold Paste Viscosity Measurement

The cooked paste from the hot paste viscosity measurement of Example 4A was cooled to 30° C. and held overnight at 4° C. Using an RFS2-BD050 rheometer (Rheometrics, Piscataway, N.J.), viscosity was measured during a shear sweep from 0.1 to 100 sec$^{-1}$ at 25° C. Parallel plates of 25 mm in diameter were used at a distance of 1.257 mm apart. Viscosity was compared at a shear of 10 sec$^{-1}$.

The cold viscosity of the four hydroxypropylated distarch phosphates of example 4A were measured and the results are shown in Graph 2, below.

As can be seen from Graph 2, controlling the degree of stabilization and the level of crosslinking of waxy potato starch at a rate of 10 sec$^{-1}$ which approximates average human mastication, yields an unexpected increase in viscosity. The modified waxy potato starch has a peak viscosity approximately 3.5 times that of modified potato starch. In contrast, the modified waxy corn starch has a peak viscosity only twice that of modified dent corn starch.

Example 5

Viscosity of Various Modified Starches

The viscosity of various modified starches were measured using the procedure of Example 4a (neutral) and the procedure of Example 4a wherein the starch was slurried in citric acid buffer at a pH of approximately 3.0 (acid). The results are shown in Tables II and III below.

a. The procedure of Example 3 was used to modify corn, waxy corn, rice, waxy rice, potato and waxy potato.

TABLE II

| Sample | Gelatinization Time, min. | | Peak Viscosity, cP | | End Viscosity, cP | |
|---|---|---|---|---|---|---|
| Base | Acid | Neutral | Acid | Neutral | Acid | Neutral |
| Corn | 2.0 | 2.0 | 630 | 400 | 630 | 400 |
| Waxy Corn | 2.0 | 2.0 | 690 | 910 | 690 | 910 |
| Rice | 1.5 | 1.0 | 260 | 175 | 230 | 175 |
| Waxy Rice | 1.5 | 1.0 | 320 | 390 | 310 | 390 |
| Potato | 5.0 | 4.0 | 500 | 450 | 500 | 450 |
| Waxy Potato | 2.3 | 4.0 | 3810 | 7310 | 3800 | 4900 |

As can be seen from Table II, the viscosity of the modified waxy potato starch was significantly higher than any of the other starches. Further, the difference between the viscosity of the waxy potato and that of the potato is significantly greater than that of any other common (non-waxy) and waxy variety.

b. The procedure of Example 1 was used to modify corn, waxy corn, rice, waxy rice, potato and waxy potato.

TABLE III

| Sample | Gelatinization Time, min. | | Peak Viscosity, cP | | End Viscosity, cP | |
|---|---|---|---|---|---|---|
| Base | Acid | Neutral | Acid | Neutral | Acid | Neutral |
| Corn | 4.3 | 16.0 | 460 | 300 | 460 | 300 |
| Waxy Corn | 2.5 | 6.0 | 670 | 1240 | 670 | 1240 |
| Rice | 2.0 | 9.0 | 300 | 350 | 300 | 350 |
| Waxy Rice | 2.0 | 4.5 | 650 | 950 | 650 | 950 |

TABLE III-continued

| Sample | Gelatinization Time, min. | | Peak Viscosity, cP | | End Viscosity, cP | |
|---|---|---|---|---|---|---|
| Base | Acid | Neutral | Acid | Neutral | Acid | Neutral |
| Potato | 1.8 | 4.5 | 1830 | 6150 | 1830 | 6150 |
| Waxy Potato | 2.3 | 7.0 | 1250 | 5800 | 1250 | 5900 |

Example 6

Preparation of a Hydroxypropylated Waxy Potato Distarch Phosphate

The method of preparation used in example 3 was followed except that 0.3 g phosphorous oxychloride was added to cross-link the starch instead of 0.2 g to produce a hydroxypropylated, waxy potato distarch phosphate with a higher degree of crosslinking.

Example 7

Frozen Cheese Sauce

This example illustrates that use of waxy potato starch in a frozen cheese sauce. The following formulation and procedure were employed:

| Frozen Cheese Sauce Formulation | |
|---|---|
| Ingredients | Percent (% by wt.) |
| Cheese Powder | 6.76 |
| Sweet Whey | 2.94 |
| Salt | 0.6 |
| Lactic Acid (22%) | 0.12 |
| Nonfat Dry Milk | 1.2 |
| Shortening Powder | 3.2 |
| Starch of Example 3 | 2.5 |
| Water | 82.68 |

All the ingredients were mixed together using conventional mixing equipment known in the art. The mixture was heated to 90° C. and held for ten (10) minutes. The mixture was then cooled to 4° C., packaged, and frozen.

The resultant cheese sauce, in the unfrozen state, has a viscosity comparable to that made with 4.5% of a hydroxypropylated waxy corn distarch phosphate.

Example 8

Yogurt

This example illustrates that use of waxy potato starch in a yogurt. The following formulation and procedure were employed:

| Yogurt Formulation | |
|---|---|
| Ingredients | Percent (% by wt.) |
| Whole Milk | 91.25 |
| Non-Fat Milk Solids | 5.0 |
| Starch of Example 3 | 0.50 |

Yogurt Formulation

| Ingredients | Percent (% by wt.) |
| --- | --- |
| Sugar | 3.0 |
| Yogurt Culture | 0.25 |

Milk, non-fat milk solids, and sugar were blended and heated to 81° C. The mixture was held at this temperature for ten minutes and then homogenized at 50 bar. The mixture was then cooled to 40° C. and the culture was added. The cultured mixture was held until pH reaches about 4.3 and then cooled to 4° C.

The resultant yogurt has a viscosity and stability comparable to that made with 1% of a hydroxypropylated waxy corn distarch phosphate.

Example 9

Dressing

This example illustrates that use of waxy potato starch in a dressing. The following formulation and procedure were employed:

Dressing Formulation

| Ingredients | Percent (% by wt.) |
| --- | --- |
| Soy Oil | 30.0 |
| White Vinegar (100 grain) | 10.0 |
| Salt | 1.7 |
| Sugar | 10.0 |
| Spices | 0.5 |
| Potassium Sorbate | 0.1 |
| Starch of Example 3 | 2.5 |
| Water | 41.2 |
| Yolk | 4.0 |

Blend the vinegar, salt, sugar, spices, potassium sorbate, starch, and water. Heat to 90° C. and hold for five minutes. Cool to 40° C. While mixing in a colloid mill, slowly add yolks, then oil.

The resultant dressing has a viscosity comparable to that made with 4% of a hydroxypropylated waxy corn distarch phosphate.

Example 10

White Sauce

This example illustrates that use of waxy potato starch in a white sauce. The following formulation and procedure were employed:

White Sauce Formulation

| Ingredients | Percent (% by wt.) |
| --- | --- |
| Light Cream | 20.0 |
| Salt | 0.5 |
| Nonfat Dry Milk | 7.0 |
| Starch of Example 3 | 3.0 |
| Water | 69.5 |

Blend together cream, salt, milk and half the water. Heat to 90° C. In a separate container, mix together the starch and the remaining water to form a starch slurry. Add to cream mixture. Hold mixture at 90° C. for ten minutes. Cool to 4° C. overnight.

The resultant white sauce has a viscosity of about 300 cP as measured using a Brockfield viscometer with spindle #21 cup and bob apparatus at 1 rpm and 50° C. which was comparable to that made with 3.5% of a hydroxypropylated waxy corn distarch phosphate.

Example 11

Pudding

This example illustrates that use of waxy potato starch in a pudding. The following formulation and procedure were employed:

Pudding Formulation

| Ingredients | Percent (% by wt.) |
| --- | --- |
| Salt | 0.1 |
| Sugar | 3.0 |
| Nonfat Dry Milk | 7.2 |
| Powdered Cream | 4.56 |
| Starch of Example 3 | 4.0 |
| Water | 81.14 |

Blend together all ingredients. Heat to 90° C. and hold 10 minutes. Cool to 50° C.

The resultant pudding has a viscosity of above 28,000 cP as measured using a Brookfield viscometer with spindle #21 cup and bob apparatus at 1 rpm and 4° C. which was comparable to that made with 4.55% of a hydroxypropylated waxy corn distarch phosphate.

Example 12

Fruit Pie Filling

This example illustrates that use of waxy potato starch in a fruit pie filling.

The following formulation and procedure were employed:

Fruit Pie Filling Formulation

| Ingredients | Percent (% by wt.) |
| --- | --- |
| Sugar | 17.7 |
| Lemon Juice | 1.0 |
| Salt | 0.2 |
| Spray Dried Cherries, powder | 7.49 |
| Starch of Example 3 | 3.0 |
| Water | 70.61 |

Blend together all ingredients. Heat to 90° C. and hold for five minutes. Cool to 40° C.

The resultant fruit pie filling has a viscosity of about 5140 cP as measured using a Brookfield viscometer with spindle #21 cup and bob apparatus at 1 rpm and 50° C. which was comparable to that made with 3.65% of a hydroxypropylated waxy corn distarch phosphate.

Example 13

Chicken Noodle Soup

This example illustrates that use of waxy potato starch in a chicken noodle soup. The following formulation and procedure were employed:

| Chicken Noodle Soup Formulation | |
|---|---|
| Ingredients | Percent (% by wt.) |
| Chicken broth | 99.56 |
| Starch of Example 1 | 0.44 |

Slurry together all the ingredients. While stirring, heat to 90° C. Fill into cans and retort using conventional methods known in the art.

The resultant chicken noodle soup has a fill viscosity of about 230 cP as measured using a Brookfield viscometer with spindle #21 cup and bob apparatus at 1 rpm and 50° C. which was comparable to that made with 1.0% of a hydroxypropylated waxy corn starch.

Example 14

Lite Pancake Syrup

This example illustrates that use of waxy potato starch in a lite pancake syrup. The following formulation and procedure were employed:

| Lite Pancake Syrup Formulation | |
|---|---|
| Ingredients | Percent (% by wt.) |
| Water | 62.3 |
| Maltodextrin (DE = 15) | 33.4 |
| Starch of Example 3 | 1.0 |
| Maple Syrup | 3.0 |
| Citric Acid | 0.09 |
| Sodium Benzoate | 0.05 |
| Potassium Sorbate | 0.05 |
| Aspartame | 0.06 |
| Carmel Color | 0.05 |

Mix together the water and starch. Heat to 90° C. and cook ten (10) minutes. Add the carmel color, then the remaining ingredients and mix well.

The resultant lite pancake syrup has a viscosity of about 230 cP as measured using a Brookfield viscometer with spindle #21 cup and bob apparatus at 1 rpm and 25° C. which was comparable to that made with 1.5% of a hydroxypropylated waxy corn distarch phosphate. Further, the resultant lite syrup was less opaque.

Example 15

Chocolate Milkshake Drink

This example illustrates that use of waxy potato starch in a chocolate milkshake drink. The following formulation and procedure were employed:

| Chocolate Milkshake Drink Formulation | |
|---|---|
| Ingredients | Percent (% by weight) |
| Water | 77.5 |
| Non-fat Dry Milk | 12 |
| Sugar | 8 |

| Chocolate Milkshake Drink Formulation 77.5 | |
|---|---|
| Ingredients | Percent (% by weight) |
| Cocoa Powder | 2 |
| Starch of Example 3 | 0.5 |

Mix together all ingredients except the water. Disperse dry mix in water. Pasteurize at 80° C. for 30 seconds. Cool to 4° C. overnight.

The resultant chocolate milkshake drink has a viscosity of about 450 cP as measured using a Brookfield viscometer with spindle #21 cup and bob aparatus at 1 rpm and 4° C. which was comparable to that made with 1% of a hydroxypropylated waxy corn distarch phosphate. The mouth feel of the two milkshake drinks were also comparable.

Example 16

Retorted Cheese Sauce

This example illustrates that use of waxy potato starch in a retorted cheese sauce. The following formulation and procedure were employed:

| Retorted Cheese Sauce Formulation | |
|---|---|
| Ingredients | Percent (% by wt.) |
| Grated Cheddar Cheese | 19.9 |
| Margarine | 8.4 |
| Starch of Example 5 | 3.0 |
| Water | 31.3 |
| Milk | 37.4 |

The cheese and margarine were melted together, mixing well. The starch was slurried in the water and then stirred into the cheese mixture. This mixture was heated to 85° C. and cooked for three (3) minutes. The milk was stirred into the heated mixture and the temperature was brought back to 85° C. The mixture was cooked at 85° C. for an additional three minutes. The cooked cheese sauce was then filled into cans, sealed, and retorted using conventional methods and conditions known in the art.

The resultant cheese sauce has a viscosity comparable to that made with 5% of a hydroxypropylated waxy corn distarch phosphate. Further, the resultant cheese sauce formulation has improved heat penetration during retorting.

Example 17

Bakery Filling

This example illustrates the use of a waxy potato starch in a bakery filling.

| Bakery Filling Formulation | |
|---|---|
| Ingredients | Percentage |
| Water | 61 |
| Sugar | 20 |
| Whipping cream | 8 |
| Dry egg yolks | 3 |

-continued

Bakery Filling Formulation

| Ingredients | Percentage |
|---|---|
| Example starch | 2.5 |
| Butter, melted | 5 |
| Salt | 0.3 |
| Vanilla | 0.2 |
| Total | 100 |

Dry blend sugar, starch, yolks and salt. Add dry blended ingredients to boiling water gradually with agitation. Continue cooking with agitation to obtain a thick gel. Remove from heat; add whipping cream, melted butter and vanilla, stirring constantly. Simmer for 4 to 6 minutes and cool. Fill baked product.

The starch of present invention is only required at 2.5% whereas customary starches would be required at 4.5%.

Example 18

Bakery Filling with Pregelatinized Starch

This example illustrates the use of a pregelatinized waxy potato starch in a bakery filling.

The instant hydroxy propylated waxy potato starches may be pregelatinized using processes known in the art, for example, such as those disclosed in U.S. Pat. Nos. 4,280,851 and 5,149,799. In general, the starch is uniformly and simultaneously atomized and cooked in the presence of an aqueous medium by means of such an apparatus as a two-fluid, internal-mix spray-drying nozzle, coupled to a means for drying the cooked, atomized starch, such as drum drying.

Bakery Filling Formulation with Pregelatinized Starch

| Ingredients | Percentage |
|---|---|
| Sugar | 15 |
| Pregel starch | 3 |
| NFDM | 2 |
| Whey protein | 2 |
| Fat powder | 2.5 |
| Lactose | 2 |
| Alginate | 0.5 |
| Salt | 0.2 |
| Water | 74.5 |
| Total | 100 |

Mix dry ingredients. Add dried to cold water. Whisk 2 minutes. Fill baked product.

The pregel starch of present invention is only required at 3% whereas customary starches would be required at 5%.

What is claimed is:

1. An edible composition comprising a hydroxypropylated crosslinked waxy potato starch.

2. The composition of claim 1, wherein the starch is a hydroxypropylated waxy potato distarch phosphate.

3. The composition of claim 1, wherein the composition is selected from the group consisting of a salad dressing, a pie filling, a bakery filling, a sauce, a gravy, a syrup, a pudding, a custard, a yogurt, a sour cream, a beverage, a glaze, and a soup.

4. The composition of claim 3, wherein the composition is a sauce and the starch is present in an amount of from about 1.0 to about 4.0% by weight of the composition.

5. The composition of claim 3, wherein the composition is a pudding and the starch is present in an amount of from about 1 to about 4.5% by weight of the composition.

6. The composition of claim 3, wherein the composition is a beverage and the starch is present in an amount of from about 0.25 to about 0.75% by weight of the composition.

7. The composition of claim 3, wherein the composition is a pie filling or a bakery filling and the starch is present in an amount of from about 1.5 to about 5% by weight of the composition.

8. The composition of claim 7, wherein the starch is pregelatinized.

9. The composition of claim 3, wherein the composition is a soup and the starch is present in an amount of from about 0.25 to about 2.0% by weight of the composition.

10. The composition of claim 3, wherein the composition is a syrup and the starch is present in an amount of from about 0.5 to about 1.5% by weight of the composition.

11. The composition of claim 3, wherein the composition is a yogurt and the starch is present in an amount of from about 0.25 to about 0.75% by weight of the composition.

12. The composition of claim 1, wherein the starch is present in a viscosifying effective amount, said amount being from about 0.01 to about 50% by weight of the composition.

13. The composition of claim 12, wherein the viscosity increasing amount is from about 0.01 to about 10% of the composition by weight.

14. The composition of claim 1, wherein the starch is pregelatinized.

* * * * *